Dec. 22, 1942.   P. R. LUERTZING ET AL   2,306,132
METHOD OF MAKING VITREOUS OPEN-ENDED ARTICLES
Filed Nov. 3, 1938   7 Sheets-Sheet 1

Inventors
Paul R. Luertzing.
Walter O. Luertzing.
By Ross J. W. Woodward
Attorney

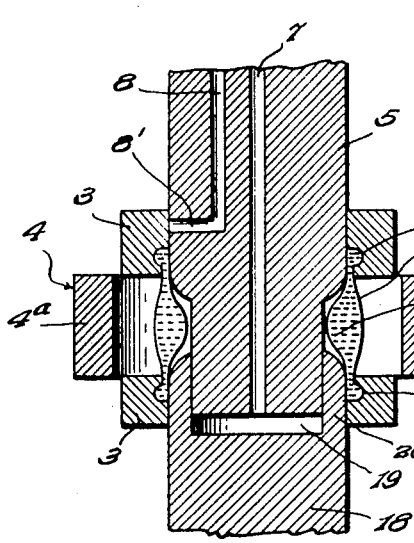
Fig. 5.
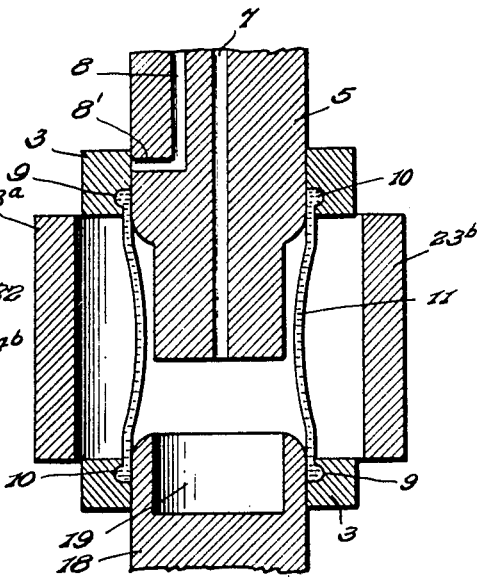
Fig. 6.
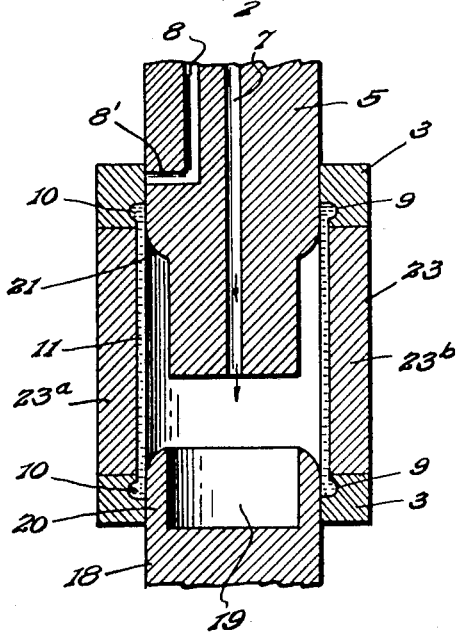
Fig. 7.
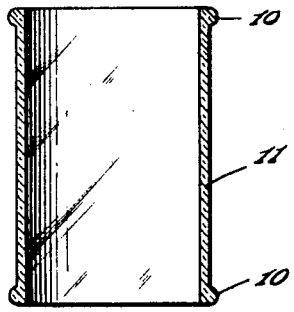
Fig. 8.
Fig. 9.
Inventors
Paul R. Luertzing.
Walter O. Luertzing.
By Ross J. Woodward
Attorney

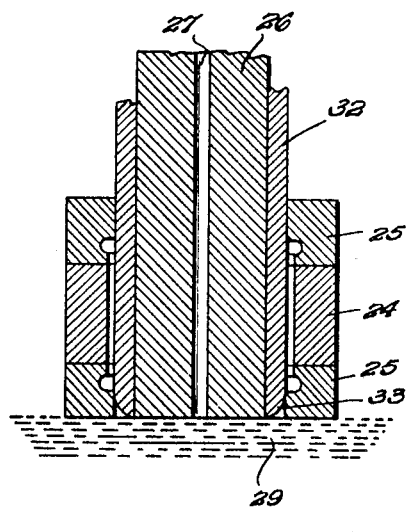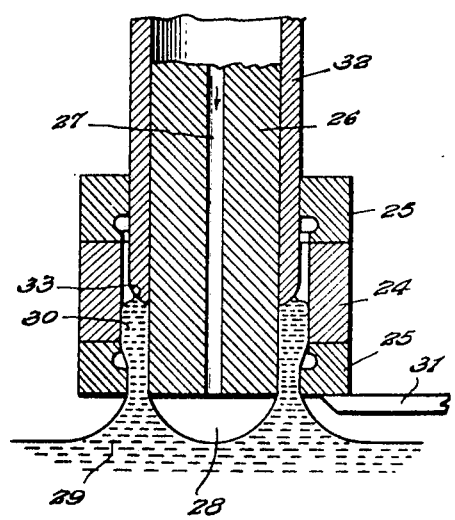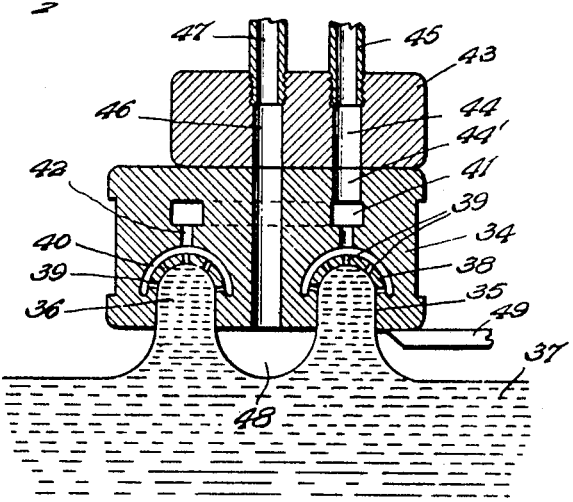

Inventors
Paul R. Luertzing.
Walter O. Luertzing.
By Ross J. Woodward
Attorney

Dec. 22, 1942.   P. R. LUERTZING ET AL   2,306,132
METHOD OF MAKING VITREOUS OPEN-ENDED ARTICLES
Filed Nov. 3, 1938   7 Sheets-Sheet 5

Inventors
Paul R. Luertzing.
Walter O. Luertzing.
By Ross J. Woodward
Attorney

Dec. 22, 1942. P. R. LUERTZING ET AL 2,306,132
METHOD OF MAKING VITREOUS OPEN-ENDED ARTICLES
Filed Nov. 3, 1938  7 Sheets-Sheet 6
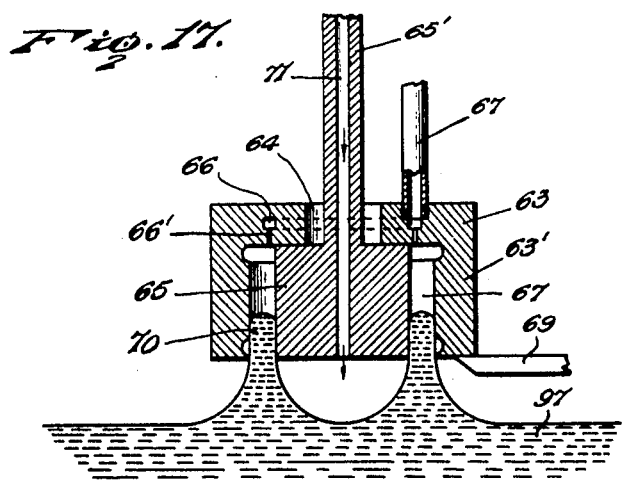
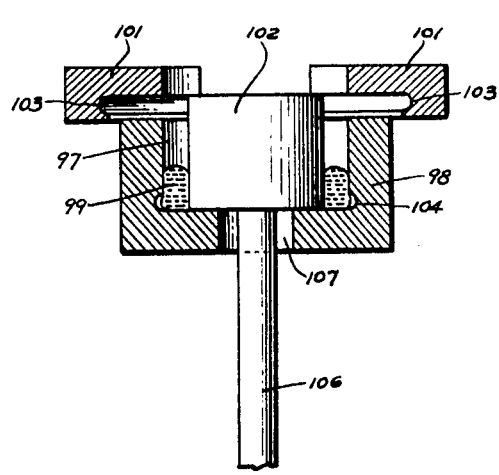 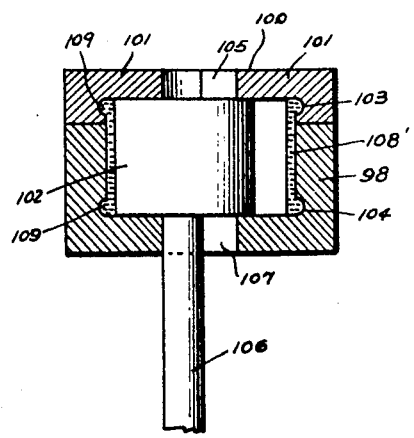
Inventors
Paul R. Luertzing.
Walter O. Luertzing.
By Ross J. Woodward
Attorney

Patented Dec. 22, 1942

2,306,132

UNITED STATES PATENT OFFICE 2,306,132

METHOD OF MAKING VITREOUS OPEN-ENDED ARTICLES

Paul R. Luertzing and Walter O. Luertzing, Vineland, N. J.

Application November 3, 1938, Serial No. 238,648

28 Claims. (Cl. 49—80)

This invention relates to a method of making open-ended articles of vitreous material which may be glass, cellulose, resin, Bakelite, or other vitreous material, and particularly relates to the manufacture of open-ended tubular articles such as a container of glass to be used for packing foods, beverages, oils and other products and having closures applied to its ends, but it is to be understood that the invention is not limited to this specific use.

One object of the invention is to provide a method wherein the article is started as a molten annular blank or charge of plastic or semi-plastic material which may be circular or any other outline desired, said blank being removed from a source of supply and which, during the steps of manufacture, is elongated and finally formed in a body open at both ends and of the desired dimensions and thickness.

Another object of the invention is to provide a method whereby open-ended vitreous articles may be easily and quickly made at low cost.

Another object of the invention is to provide a method wherein a predetermined quantity of material is withdrawn from a molten source of supply in the form of an annular charge or plastic blank and transformed into the finished article with a few number of steps, all of which may be automatically carried out.

Another object of the invention is to provide a method wherein a blank mold may be used as a blank forming mold and then elongated to stretch the annular blank or charge and used as a finishing mold for completing formation of the article.

Another object of the invention is to provide a method wherein the blank, after being removed from the source of supply, is formed with a thickened intermediate portion, thus providing ample material in this portion of the partially formed article to permit it to be extended longitudinally to the desired length without separation of its end portions.

Another object of the invention is to provide a method wherein air may be employed as means for forcing the distended blank into contact with walls of the finishing mold and thus cause force to be evenly distributed and an open-ended article formed.

The invention is illustrated in the accompanying drawings, wherein:

Figure 5 is a vertical sectional view showing the blank body mold opened preparatory to stretching the blank.

Figure 6 is a similar view showing the blank stretched to a predetermined length and a finishing body mold substituted in place of the blank body mold and about to be closed about the stretched blank.

Figure 7 shows a finishing body mold closed and the stretched blank expanded therein to form the container body.

Figure 8 is a sectional view taken vertically through a container body removed from the mold.

Figure 9 is a top plan view of the container body.

Figure 10 is a sectional view taken vertically through a modified form of blank withdrawing mold and showing the mold in position to withdraw a charge.

Figure 11 is a similar view showing a charge withdrawn by the modified form of mold.

Figure 12 is a vertical sectional view showing another modified form of blank withdrawing mold filled with a charge drawn from a mass of molten material.

Figure 17 is a sectional view taken vertically through a modified form of mold for withdrawing a charge of glass from a source of supply and making a container body.

Figure 23 is a sectional view taken vertically through a modified form of finishing mold for forming a container body, the mold being open and a charge of molten glass deposited therein.

Figure 24 is a view similar to Figure 23 showing the mold closed and the container body formed therein.

Figure 1:
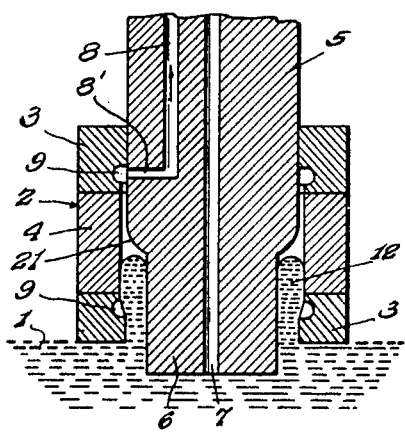
Figure 1 is a sectional view taken vertically through a mold and illustrating the manner in which the annular charge or blank is drawn from a mass of molten glass or other vitreous material.
Figure 2:
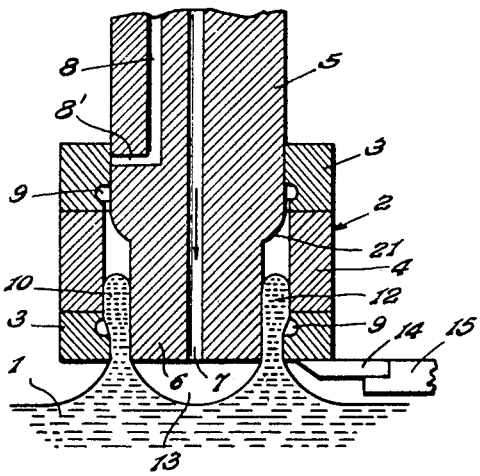
Figure 2 is a similar view showing the charge about to be severed from the mass.
Figure 3:
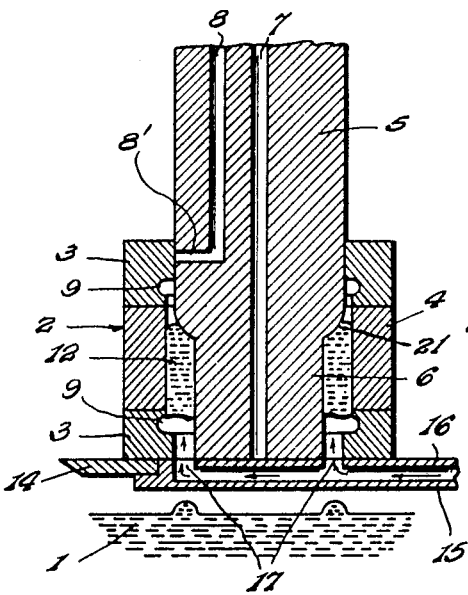
Figure 3 shows the charge forced upwardly in the mold.

The method and apparatus constituting the subject matter of this invention is employed to manufacture open-ended containers formed of vitreous material which, for convenience, will be referred to hereinafter as glass, but may be cellulose, resin, Bakelite, or any other thermo-plastic material found suitable. This vitreous material is heated in a suitable pot or the like to reduce it to a plastic state and such a mass of plastic material is shown in Figures 1, 2 and 3 of the drawings and indicated by the numeral 1. A predetermined quantity of the plastic material is to be removed from the plastic mass 1 to form an annular charge or blank instead of using a gob of molten glass to start the operation.

In order to remove the glass in the form of an annular charge, a blank mold is employed, this mold, indicated in general by the numeral 2, being referred to as a blank mold and having upper and lower end mold sections 3 and a short intermediate mold body 4 which fits between the end sections and is formed of companion side sections movable laterally towards and away from each other so that the mold is adapted to be opened, as shown in Figure 5, during one step or stage of manufacturing the containers. A core 5 slidably enters the mold through the upper end mold section and has a reduced lower end portion 6 and this core is formed with a longitudinally extending central passage 7 for admitting air under pressure, and a second longitudinally extending passage 8 through which air is to be drawn by a suitable suction pump to create a vacuum condition in the mold. Each of the end mold sections 3 is formed with an internal annular channel 9 for forming outstanding beads 10 about ends of the finished container 11, as shown in Figures 8 and 9. It will be understood that lugs or threads may be formed instead of continuous beads. When the core is in the position shown in Figure 1, the passage 8 registers with the channel of the upper end section so that air may be drawn from the mold through this passage to draw a predetermined quantity of glass 12 from the mass of molten glass 1 and hold this glass in the mold to form an annular charge or blank. During the step of drawing the glass from the mass 1, the core extends downwardly below the open lower end of the mold and into the main mass of glass as shown in Figure 1, but when the core is shifted upwardly by suitable mechanism to dispose the side extension 8' of the passage 8 above the channel 9 of the upper end section 3 of the mold and suction through the passage 8, the lower end of the core will be flush with the lower end of the mold. While suction through the passage 8 will be cut off, air will be prevented from entering the upper end of the mold about the core 5 which has close fitting engagement with the upper mold section and a sufficient vacuum will be maintained in the mold chamber above the annular charge to hold the charge in the mold. As the core is shifted upwardly, air under pressure is forced downwardly through the passage 7 to force the glass under the core downwardly, as shown in Figure 2, and form an air pocket 13, and a cutter is employed to sever the glass flush with the lower end of the mold and core. This cutter is carried by a bar or plate 15 which will be mounted for reciprocating movement, in any desired manner, and upon referring to Figure 3, it will be seen that the bar is formed with a longitudinally extending air passage 16 through which air under pressure flows and out through the perforations 17 to force the annular blank 12 upwardly in the annular chamber of the mold about the reduced lower end portion of the core. It will thus be seen that an annular blank of molten glass or other vitreous material may be withdrawn from a main mass into a blank forming mold and held therein by a vacuum condition in the upper end portion of the mold chamber about a core extending vertically in the mold through the upper end thereof and blocking the upper end of the mold chamber.

Figure 4:
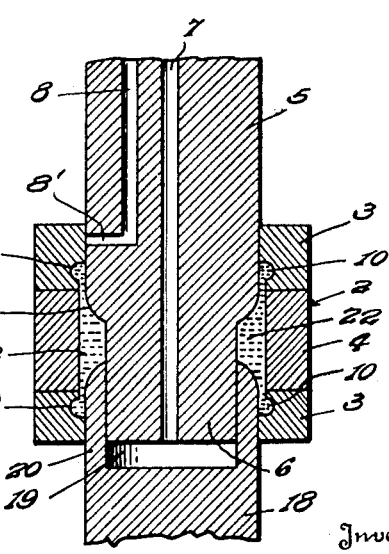
Figure 4 shows the blank compressed in the mold to form a thickened intermediate portion.

After the annular blank or charge has been formed in the mold, the mold is shifted away from its position over the glass pot by suitable means and a plunger 18 formed with a pocket 19 in its upper end defining an annular flange or wall 20, is moved upwardly through the lower end section of the mold, as shown in Figure 4. This flange or wall 20 is bevelled from its outer face and cooperates with the rounded shoulder 21 of the core to compress the glass blank and form a thickened intermediate portion 22 and force the upper and lower end portions of the blank into the channels or grooves 9 and form the heads 10 of the finished article.

After this step in the manufacture has been accomplished, the reshaped blank will be firmly mounted between the end sections of the mold and the companion sections 4ᵃ and 4ᵇ forming the body of the blank mold may be shifted transversely from between the end sections 3, as shown in Figure 5, where they will be out of the way. The end sections and the core and plunger are then shifted away from each other, the core and the plunger moving with companion end sections, or one end section and the companion core or plunger held stationary, while the other set of companion elements are shifted away from the first set to stretch and elongate the thickened glass blank. Any suitable means may be employed to shift the mold sections and the core and plunger longitudinally. The fact that the annular mass of glass has a thickened portion permits it to be stretched and form the incomplete tubular body 11 of the container having its walls of substantially an even thickness throughout its length.

The companion sections 23ª and 23ᵇ for forming the body 23 of a finishing mold are now shifted into place between the end sections 3 to form a closed finishing mold of the proper length, and air under pressure is forced inwardly through the air passage 7 to radially expand the partially formed container body and hold the walls thereof in close contacting engagement with the inner surface of the walls of the body 23 of the finishing mold. The container body 11 will then be of a suitable diameter and thickness throughout its length and have its ends formed with outstanding annular beads 10 and when the glass has sufficiently cooled, the companion sections forming the body 23 and the end sections 3 of the mold are shifted laterally away from each other to an opened position to permit removal of the finished container body therefrom.

A container body of desired length and diameter and configuration in cross section, and formed with outstanding beads at its ends may, therefore, be easily and quickly formed. While the container body has been shown of an even diameter and a true cylindrical configuration, it is to be understood that the invention is not restricted to making container bodies of the particular type shown, as by modifying the inner surfaces of the mold sections, container bodies of other configurations may also be made.

In Figures 10 and 11, there has been illustrated a modified blank mold for withdrawing molten glass from the glass pot. This mold has a body 24 and sections 25 corresponding to those of the previously described mold, and a core 26 operates through the mold and is formed with a longitudinally extending air passage 27 through which air under pressure is to be forced to form the depression or air pocket 28 in the main body of molten glass 29 after a portion thereof has been drawn up into the mold to form the charge 30 and permit the charge to be easily severed from the main body of glass by the knife 31. Instead of creating a vacuum condition in the upper portion of the mold to draw the glass upwardly therein, there is provided a suction sleeve 32 which snugly fits about the core and within the cavity of the mold and is slidable longitudinally from the lowered position of Figure 10 to the raised position of Figure 11. When the suction sleeve is in its lowered position and the lower ends of the sleeve and core are flush with the lower end of the mold, the mold can be disposed in contact with the mass of molten glass 29 and, upon upward movement of the sleeve, a suction will be created which will draw the glass up into the mold about the core and form the annular charge which is cut off by the knife 31 after air has been forced downwardly through the air passage 27 to form the air pocket 28. The lower end of the sleeve has its edge portions rounded, as shown at 33, to provide a rounded shoulder corresponding to the shoulder 21, and, therefore, when the charge is forced upwardly in the mold about the sleeve, the same action will take place as shown in Figure 3. The same steps illustrated in Figures 4 through 7 can then be carried out and the finished container body formed as previously described.

Instead of drawing the glass directly from the glass pot into the blank mold, the annular charge of molten glass may be withdrawn by a separate charge-withdrawing member and delivered therefrom into the blank mold. A charge-withdrawing device suitable for this purpose is illustrated in Figure 12, and consists of a body 34 formed with an annular pocket 35 into which the charge 36 of molten glass is to be drawn from the main body of glass 37. The top 38 of the pocket 35 is perforated, as shown at 39, and above the top is a space 40 connected with annular channel 41 by an annular slot 42. A block 43 which may constitute a portion of means for shifting the body 34 from one position to another, is secured against the upper face of the body in any desired manner and formed with an air passage 44 of which the passage 44' in the body forms a continuation so that air may be drawn from the pocket 35 through a pipe 45 leading to a suction pump and a charge of molten glass drawn into the pocket. A passage 46 through which air under pressure is to flow from the pipe 47, is formed through the block 43 and the body 34 opens through the lower face of the body so that after a charge of glass has been drawn into the pocket, the air pocket 48 may be formed and the glass then severed by means of the cutting blade 49.

Figure 13:
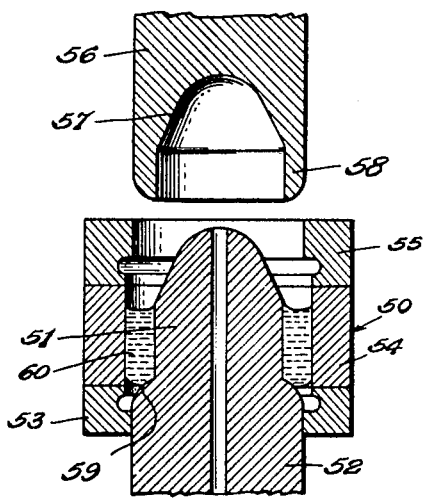
Figure 13 is a vertical sectional view of a modified form of mold into which the blank, after being withdrawn from the mass, is transferred, the mold shown in this figure having a lower core and an upper plunger associated therewith.
Figure 14:
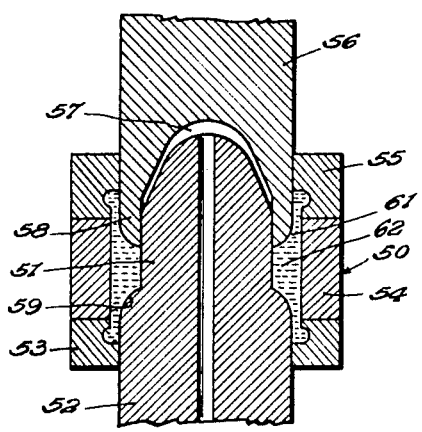
Figure 14 is a vertical sectional view showing the apparatus of Figure 13 with the core and the plunger shifted into the mold to form the blank with a thickened intermediate portion.
Figure 15:
Figure 15 is a sectional view taken diametrically through the annular blank of Figure 12.

The charge of glass which has been drawn from the main body of glass is now transferred to the blank mold 50, shown in Figures 13 and 14, by shifting the charge-withdrawings device over the blank mold and admitting air into the charge-withdrawing device over the charge so that the charge will drop by gravity from the pocket 35 into the cavity of the blank mold about the reduced upper end portion 51 of the core 52 which extends upwardly through the lower end section 53 of the mold and through the body 54 thereof into the upper end section 55. A plunger 56 operates through the upper end section of the mold and is formed with a lower recess 57 defining an annular wall 58 which fits snugly about the reduced upper end portion of the core 52 and cooperates with the annular shoulder 59 of the core to transform the annular blank 60 into the partially formed container body 61 having the thickened intermediate portion 62. The steps of forming the completed container body will now be continued, as shown in Figures 5 through 7.

Figure 18:
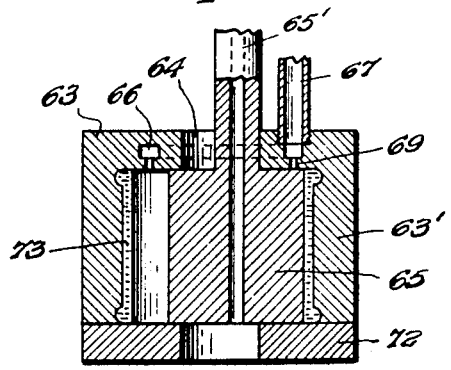
Figure 18 is a vertical sectional view illustrating the manner in which the charge is rolled in against walls of the mold shown in Figure 17 to form a container.
Figure 16:
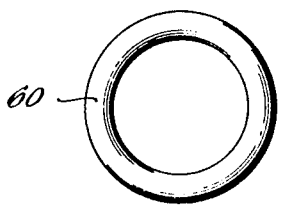
Figure 16 is a top plan view of the blank shown in Figure 15.

In Figures 17 and 18, there has been shown another form of mold for making a container body. In this embodiment of the invention, a mold body 63 having a depending annular wall 63' is employed. The body is open at its lower end and its upper wall or head is formed with a center opening 64 to receive the shank 65' of a cylindrical core or roller 65. An annular channel 66 is formed in the head of the mold concentric to the opening 64 and provided with an entrance slot 66' so that when the core 65 is disposed centrally of the mold chamber and suction exerted through the pipe 67, a charge of plastic glass may be drawn upwardly from a main supply of glass 68 in a glass pot and cut off by the cutter 69 to form an annular charge or blank 70 after air has been forced through the passage 71 to force glass away from the under face of the roller as shown in Figure 17. A bottom wall or cap 72 is then shifted laterally into position to close the lower end of the mold and the shaft 65 of the core or roller rotated by suitable driving means and at the same time moved in a circular orbit or path about the walls of the opening 64. Any well known mechanical driving mechanism may be employed for rotating the shaft 65' and moving it in a circular orbit. The roller acts upon the annular blank to press or roll the same against the walls of the mold chamber and extend the blank longitudinally therein and eventually forms a glass container body 73 corresponding in outline to those previously described and illustrated in Figure 8 of the drawings.

Figure 19:
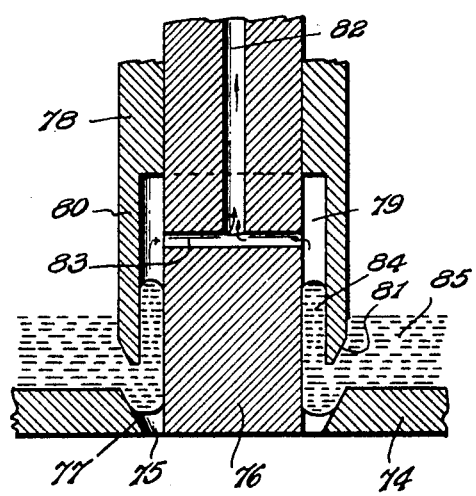
Figure 19 is a vertical sectional view of a modified form of means for withdrawing a measured quantity of molten material from the main mass to form an annular blank.
Figure 20:
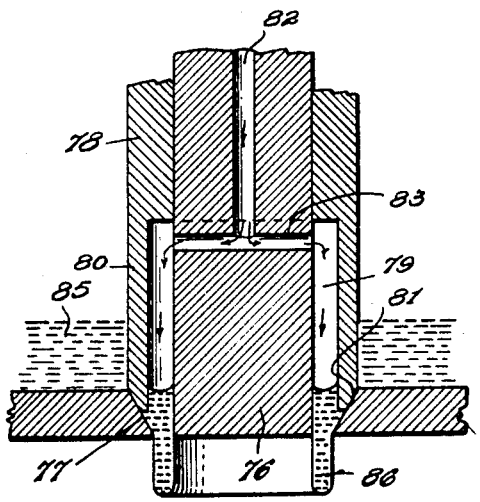
Figure 20 is a view showing the manner in which the blank formed in the apparatus illustrated in Figure 19 is discharged.

Instead of withdrawing the molten glass from a glass pot by a charge-withdrawing device such as shown in Figure 12, and then transferring this charge or annular blank into a blank mold where it is to be shaped, as shown in Figures 13 and 14, the molten glass may be fed directly from the glass pot into the blank mold, as shown in Figures 19 and 20. Referring to these figures, it will be seen that the glass pot has its bottom 74 formed with an opening 75 into which extends a core 76 held concentric to the opening by a suitable overhead support. Therefore, an outlet is provided through the bottom of the glass pot and this outlet has bevelled walls 77. A sleeve 78 fits snugly about the core and has its lower end portion enlarged internally to provide a channel or annular pocket 79 surrounded by a wall 80 having its lower end bevelled, as shown at 81, to conform to the taper of the bevelled walls 77 of the annular outlet 75. An air passage 82 is formed through the core 76 centrally thereof and, at its lower end, communicates with a transverse passage 83 so that when the sleeve 78 is in the raised position of Figure 19, and suction is created through the air passage 82, a charge of molten glass 84 may be drawn into the pocket 79. The sleeve 78 is then shifted downwardly to bring its bevelled lower end into a contacting engagement with the walls 77 of the outlet opening 75 and isolate the charge from the main body of molten glass in the glass pot, as shown in Figure 20. Air under pressure is then forced through the air passage 82 and into the upper portion of the pocket 79 to force the charge out of the pocket through the opening 75 and form an annular blank 86 which is received in the chamber of a blank mold such as shown in Figures 13 and 14, where it will be operated upon as previously described to form the finished container body. The air passage 82 will be connected with a suction device and a source of air under pressure by a two-way valve.

Figure 21:
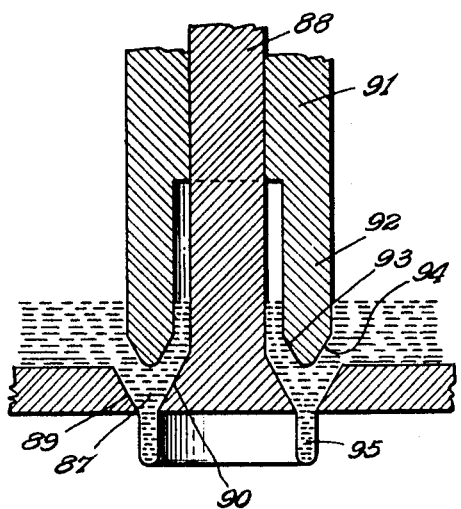
Figure 21 is a vertical sectional view of another modified form of means for forming an annular blank.
Figure 22:
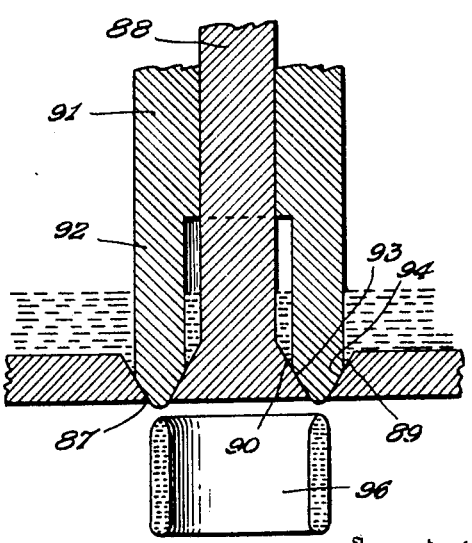
Figure 22 is a view similar to Figure 21 showing the blank delivered therefrom.

In Figures 21 and 22 there has been illustrated another means for directly delivering the glass blank from the glass pot through the bottom thereof into the blank mold. In this form of the invention, the bottom of the glass pot is formed with an annular discharge opening 87 surrounding the lower end of a column 88 and having bevelled walls 89 and 90. A sleeve 91 is slidably mounted about the column 88 and has its lower portion internally enlarged in thickness to form an annular valve or closure 92 having its lower end bevelled from its inner and outer faces, as shown at 93 and 94, to conform to the taper of the bevelled walls of the annular outlet opening 87. By raising the sleeve 91 to the elevated position shown in Figure 21, glass will flow out through the annular opening 87, as shown at 95, and the sleeve will then be shifted downwardly into engagement with the walls of the outlet to close this opening. As the sleeve moves downwardly, the glass will be urged downwardly ahead of it and discharged from the glass pot in the form of an annular charge or blank 96 which drops into the blank mold, where it will undergo the operations previously set forth to form the finished container body.

In Figures 23 and 24 there has been illustrated an embodiment of the invention wherein the glass charge is withdrawn from the main supply and then transferred into the mold shown in these figures, for forming a container body by rolling the glass against walls of the mold. The device shown in Figure 12 may be employed for withdrawing a charge from the main mass of molten glass and this charge is then deposited in the chamber 97 of the shaping mold 98, as shown at 99, and a cap 100 formed of separable sections 101, applied to the open top of the mold to confine the roller 102 therein. The cap sections have their under faces channelled, as shown at 103, and the walls of the mold body are also channelled, as shown at 104, and when the roller 102 is rotated and moved in an orbit about margins of the opening 105 between the closed cap sections by suitable means engaged with the shank 106 of the roller which passes through an opening 107 formed centrally of the bottom of the mold to press or roll the annular blank against the walls of the mold, the plastic glass will be extended longitudinally and reduced in thickness to form a container body 108' having beads 109 at its ends.

Figure 25:
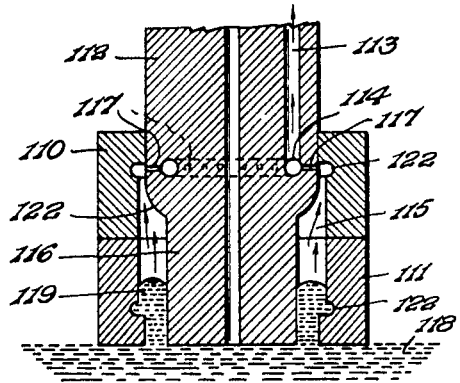
Figure 25 is a sectional view taken vertically through a modified form of blank mold.
Figure 26:
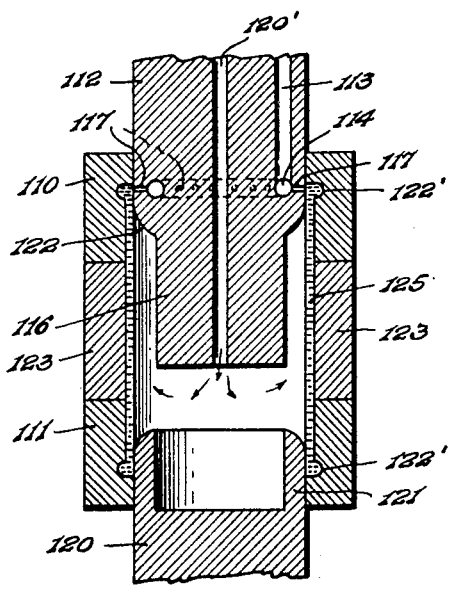
Figure 26 is a similar view showing the blank mold of Figure 25 extended to stretch the blank and a finishing body mold inserted about the stretched and expanded blank to form the container body.

In Figures 25 and 26 another embodiment of the invention has been illustrated. The blank mold illustrated in these figures consists of upper and lower sections 110 and 111 corresponding to the end sections 3 but it should be noted that these sections are of greater length than sections 25 and have direct engagement with each other instead of an intermediate blank mold section being disposed therebetween. The core 112 extends into the mold through the upper section and is formed with a passage 113 through which air may be sucked from an annular channel 114 and air drawn from the space 115 in the mold about the reduced lower portion 116 of the core through the perforations 117 and a charge of glass drawn from the main supply 118 into the mold to form the annular blank 119. The mold will then be raised and the charge cut off from the main supply at the lower end of the mold. Since suction continues in the passage 113, the charge or blank will be retained in the mold. The mold is then transferred to a position in which the plunger 120, corresponding to the plunger 18, may be moved upwardly through the bottom section 111 and its annular flange 121 engage about the lower portion of the core to cooperate with the annular shoulder 122 of the core and act upon the glass to force portions thereof into the channels 122' and also form a thickened intermediate portion similar to that shown in Figure 4. The end sections, together with the core and the plunger are then shifted away from each other by suitable mechanism to stretch the shaped blank, or one section and the companion core or plunger held stationery while the other is shifted to effect the stretching operation. The intermediate mold sections 123, taking the place of the mold sections 23a and 23b, are then shifted into position about the stretched blank or partially finished container body, between the end sections 110 and 111, and air under pressure forced through the air passage 120' and into the finishing mold thus formed, to expand the partially formed container body against the walls of the mold and form the finished container body 125, which is of predetermined length, diameter and configuration. The finishing mold is then opened and the container body removed.

Figure 27:
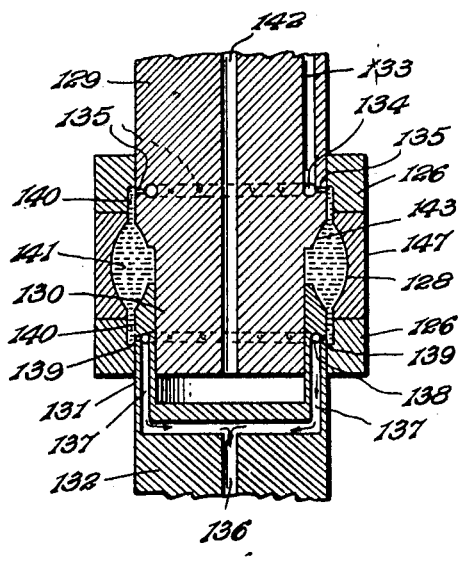
Figure 27 is a vertical sectional view of another modified form of blank mold.

In Figure 27, there has been illustrated a blank mold which is provided with end sections 126 and an intermediate section 127 corresponding to those shown in Figures 1 through 5, but channels corresponding to the channels 9 are omitted and the intermediate mold section 127 is formed with an internal annular recess 128. The core 129 which enters the blank mold through the upper end section, has a reduced lower portion 130 about which the annular flange 131 of the plunger 132 engages. The core is formed with a passage 133 leading from an annular channel 134 provided with inlet perforations 135, so that air may be sucked from the mold about the core to draw a charge of plastic glass into the mold to form an annular blank. The plunger 132 is also formed with a passage 136 having branches 137 extending to an annular channel 138 having inlet perforations 139, and when the blank of plastic glass is distorted by action of the plunger and the core to form reduced end portions 140 and a thickened intermediate portion 141, the suction through the passage 133 and passage 136 will cause the blank to be firmly held at its ends and the intermediate portion stretched when the mold is extended as previously described, to form the incomplete container body which is to be expanded in a finishing mold by air forced inwardly through the air passage 142. In view of the fact that the intermediate mold section 127 is internally recessed about space between the shoulder 143 of the core and the inner end of the plunger, the distorted blank will have its intermediate portion externally thickened as well as internally thickened. This external thickening may be provided for in the molds previously described as well as in the mold shown in Figure 27.

Figure 28:
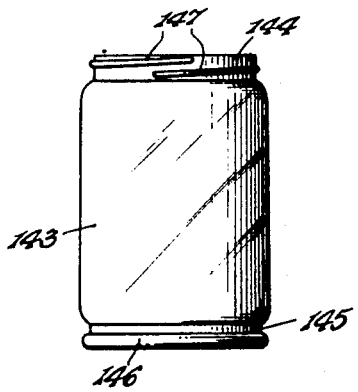
Figure 28 is a side elevation of a modified form of container body.

The shape of the container body is not restricted to a tubular body which is circular in cross section and of an even diameter throughout its length, nor do its end portions have to be formed with outstanding beads extending entirely about its circumference, as shown in Figures 8 and 9. One modified form of container body is illustrated in Figure 28. This container body 143, which may be circular, rectangular, or of any other outline in cross section, has its end portions reduced and formed with upper and lower necks 144 and 145, the lower neck being formed with an external bead 146 and the upper neck having external threads 147. Therefore, a bottom may be fixedly applied to the lower neck and a cap removably applied to the upper neck. Decorations or a name or trade mark may also be formed upon the container body during treatment in the finishing mold, if so desired.

It will thus be seen that in all of the embodiments of the invention illustrated, the container body is formed by first forming an annular charge or blank of plastic glass and then extending and shaping the blank to form a cylindrical or tubular container body having outstanding means about its ends for engagement by closures constituting the top and bottom of the container.

Having thus described the invention, what is claimed is:

1. The method of making an open-ended article of vitreous material comprising withdrawing a predetermined quantity of plastic vitreous material from a source of supply into a mold as an annular charge, subjecting the charge to pressure from its opposite ends to distort the charge longitudinally in the mold and form a thickened intermediate portion and thin end portions interlocked with end portions of the mold, removing intermediate portions of walls of the mold, shifting end portions of the mold away from each other to stretch the distorted charge longitudinally and form an open-ended body of a predetermined length and thickness, replacing the removed mold sections with mold sections of a length to fit snugly between the end portions of the mold, and subjecting the body to internal pressure to expand the same into contact with walls of the mold and form an open-ended body of a predetermined diameter throughout its length.

2. The method of making an open-ended article of vitreous material comprising withdrawing a predetermined quantity of plastic vitreous material from a source of supply into a mold having an annular chamber to form an annular charge, transferring the annular charge as an annular blank into a mold having end sections and a removable intermediate section, applying pressure to said blank to distort the blank longitudinally in the mold and form thin end portions interlocked with the end sections of the mold and a thickened portion, removing the intermediate section of the mold and shifting the end sections away from each other to stretch the blank longitudinally and form an open-ended body of predetermined length, replacing the intermediate section of the mold with another of a length adapting it to fit snugly between the end sections and form a finishing mold, and forcing air into the finishing mold to expand the body into close contacting engagement with walls of the mold and form an open-ended body of predetermined diameter and configuration.

3. The method of making an article of vitreous material open at both ends comprising forming an annular blank of plastic vitreous material, applying pressure to said blank axially thereof to distort the blank longitudinally and form a thickened intermediate portion and reduced end portions of predetermined diameter, thickness and external configuration, applying stretching force to the distorted blank longitudinally thereof to extend the said thickened intermediate portion thereof and form a body of predetermined length open at both ends, and subsequently expanding the stretched intermediate portion radially of the body to impart a predetermined diameter and configuration to the body throughout its length.

4. The method of making an open-ended article of vitreous material comprising removing an annular charge of plastic vitreous material from a source of supply, applying pressure to said charge from opposite ends thereof to distort the charge longitudinally and form an inwardly thickened intermediate portion and reduced end portions of predetermined thickness and external configuration, extending the distorted charge longitudinally to stretch the thickened intermediate portion and form a body of predetermined length open at both ends and having walls of predetermined thickness, and expanding the body radially thereof to impart a predetermined diameter and configuration thereto.

5. The method of making an open-ended article of vitreous material comprising withdrawing an annular charge of plastic vitreous material from a source of supply to form an annular blank, and confining the blank in a mold having end sections shiftable towards and away from each other, operating upon the blank within the mold to distort the blank and form the same with a thickened intermediate portion and interlock its end portions with the end sections of the mold, shifting the end sections of the mold away from each other to stretch the thickened portion of the distorted blank longitudinally and form an open-ended body of predetermined length, and expanding the stretched blank transversely to form a finished body of predetermined diameter and configuration.

6. The method of making an open-ended article of vitreous material comprising confining a predetermined quantity of plastic vitreous material as an annular charge in a mold having end sections shiftable away from each other, applying compressing pressure to the charge to distort the charge longitudinally in the mold and form a thickened intermediate portion and interlock end portions of the charge with the end sections of the mold, shifting the end sections of the mold away from each other to stretch the charge longitudinally to a predetermined length and form an open-ended body having walls of a desired thickness, and expanding the body transversely to a predetermined diameter throughout its length.

7. The method of making an open-ended article of vitreous material comprising confining a predetermined quantity of plastic vitreous material as an annular charge in a mold having end sections shiftable away from each other, applying compressing pressure to the charge to distort the charge longitudinally in the mold and form a thickened intermediate portion and interlock end portions of the charge with the end sections of the mold, shifting the end sections of the mold away from each other to stretch the charge longitudinally to a predetermined length and form an open-ended body having walls of a desired thickness, enclosing the stretched body by disposing intermediate wall sections about the body between the end sections of the mold with ends of the intermediate wall sections in close contacting engagement with the end sections, and expanding the enclosed body into close contacting engagement with the intermediate wall sections of the mold to impart to the body a predetermined diameter and configuration.

8. The method of making a hollow open-ended article from a charge of plastic vitreous material, which consists in shaping the charge to form an annular blank of predetermined length, internal diameter and wall thickness, applying pressure to said blank longitudinally thereof to distort the blank longitudinally and form an internally thickened intermediate portion and reduced end portions, stretching the distorted blank longitudinally to thin out and extend the thickened intermediate portion thereof and form an open-ended body of greater length and less wall thickness than the blank, and expanding the body transversely against a forming surface designed to impart a predetermined external configuration to the body and to adapt it to be expanded to an internal diameter greater than the internal diameter of the blank.

9. The method of making an open-ended article of vitreous material comprising providing an annular blank of plastic vitreous material, applying pressure to said blank from opposite ends thereof to distort the blank longitudinally and so as to form the same with a thickened intermediate portion and relatively thin end portions, extending the distorted blank longitudinally by the action of stretching means engaging the thin end portions so as to produce a relatively elongated open-ended body having walls of substantially uniform thickness, and expanding the body to impart a predetermined internal diameter and external configuration thereto.

10. The method of making an open-ended article of vitreous material comprising disposing an annular open-ended blank of plastic vitreous material in a mold having relatively movable members, compressing the blank in the mold so as to distort the blank and form the same with a thickened intermediate portion and relatively thin end portions and to effect a gripping engagement of said end portions of the blank with the relatively movable mold members, moving the relatively movable mold members and causing them through their gripping engagement with the ends of the blank to stretch the distorted blank and form an elongated open-ended body of predetermined length, and expanding the body transversely to form a body of predetermined diameter and configuration.

11. The method of making an open-ended article of vitreous material comprising taking an annular blank of plastic vitreous material and subjecting the blank to distorting pressure such as to reduce its wall thickness at its ends and to bulge it and increase its wall thickness between its ends, stretching the blank longitudinally to reduce the wall thickness of its thickened portion to substantially the wall thickness of its ends and to elongate the blank to form an open-ended body of a predetermined length greater than the length of the original blank and having walls of a substantially uniform thickness, and expanding the body to a predetermined internal diameter throughout its length.

12. The method of making an open-ended article of vitreous material which consists in introducing a predetermined quantity of plastic vitreous material as an annular blank into a blank mold having an annular forming chamber and including end portions relatively movable toward and from each other and intermediate portions movable into and out of working positions between the end portions, subjecting the charge to pressure to distort the charge longitudinally in the mold and so as to form the blank with a thickened intermediate portion and thin end portions and to interlock the latter with the end portions of the mold, removing the intermediate portions of the walls of the mold, shifting the end portions of the mold away from each other to stretch the distorted charge longitudinally and thin out its thickened intermediate portion and thereby form an open-ended body of a predetermined length greater than that of the original blank and of a substantially uniform wall thickness, replacing the removed blank mold sections with mold sections of a length to fit snugly between the end portions of the mold and to form therewith a finishing mold, and subjecting the body in the finishing mold to internal pressure to expand the same into contact with walls of the mold and form an open-ended body of a predetermined diameter greater than that of the original blank and having an external configuration conforming to the mold walls with which it is expanded into contact.

13. The method of making an open-ended article of vitreous material which consists in introducing a charge of plastic vitreous material into a mold having an annular chamber with which the charge annularly conforms and comprising end sections and a removable intermediate section, applying pressure to said charge longitudinally thereof so as to distort the charge longitudinally in the mold and form the same with thin end portions interlocked with the end sections of the mold and with a thickened intermediate portion, removing the intermediate section of the mold and shifting the end sections away from each other to stretch the blank longitudinally and form an open-ended body of greater length and less wall thickness than the original charge, replacing the intermediate section of the mold with another section of a length adapting it to fit snugly between the shifted end sections and form therewith a finishing mold, and establishing a pressure within the finishing mold to expand the body into close contacting engagement with walls of the mold and form an open-ended body of predetermined diameter and configuration determined by such walls of the mold.

14. The method of making an open-ended article of vitreous material comprising withdrawing a predetermined quantity of plastic vitreous material from a source of supply and enclosing the same in the form of an annulus in a mold, and subjecting the annular charge in the mold successively to compression, stretching and expansion forces such as to transform the charge into an open-ended body of greater predetermined length and internal diameter than the annular charge and of a substantially uniform wall thickness less than the wall thickness of the annular charge.

15. The method of making an open-ended article of vitreous material comprising introducing a charge of plastic vitreous material from an initial source of supply of the material into a mold having an annular forming chamber, and disposing the same therein in the form of an annulus of predetermined length, internal diameter and wall thickness, and operating upon said blank to extend the same longitudinally and expand the same diametrically so as to form an open-ended body of greater length and internal diameter and of less wall thickness than the blank.

16. The method of making an open-ended article of vitreous material comprising pneumatically feeding a charge of plastic vitreous material in an annular form directly from a supply batch into a mold having an annular forming chamber, severing the charge from the batch to form an annular blank in the mold, and operating upon said blank to extend the same longitudinally and expand the same dimetrically so as to form an open-ended body of greater length and internal diameter and of less wall thickness than the blank.

17. The method of making an open-ended article of vitreous material comprising suction drawing a charge of plastic vitreous material directly from a supply batch into a mold having an annular chamber, severing the charge from the batch so that the charge will be disposed as an annular blank in said chamber, and operating upon said blank to extend the same longitudinally and expand the same diametrically so as to form an open-ended body of greater length and internal diameter and of less wall thickness than the blank.

18. The method of making an open-ended article of vitreous material comprising introducing an annular charge of plastic vitreous material of a predetermined length, internal diameter and wall thickness into a mold having relatively movable wall portions, compressing the annular charge in the mold to reduce its wall thickness at its ends and increase its wall thickness between its end and to form said ends with external projections and interlock the same with said wall portions of the mold, moving said mold wall portions away from each other to stretch the charge and thin out the thickened charge portion to form an open-ended body of greater length and less wall thickness than the original charge, and then while maintaining the ends of the body in interlocked engagement with said mold wall portions expanding the body to an internal diameter greater than the internal diameter of the original charge.

19. The method of making an open-ended article of vitreous material comprising forming an annular blank of plastic vitreous material open at both ends and of a predetermined fixed length and wall thickness, extending the blank longitudinally to form a sleeve-like body open at each end and of greater length and less wall thickness than the blank, and subsequently expanding the extended body transversely to form a body open at each end and of substantially uniform internal diameter.

20. The method of making an open-ended article of vitreous material comprising forming an annular ring-like blank of plastic vitreous material open at both ends and of a predetermined length but varying wall thickness, stretching the blank in the direction of its axis to a predetermined length to form a sleeve-like body open at both ends and of greater length than the blank and of a substantially uniform wall thickness but varying internal diameter, and then exerting internal pressure upon and radially expanding the body to form an annular body open at both ends and of substantially uniform internal diameter.

21. The method of making a hollow open-ended vitreous article from a charge of plastic vitreous material which consists in shaping the charge to form an annular blank of predetermined fixed length, internal diameter and wall thickness and substantially fully open at each end, and operating upon said blank to first extend the same longitudinally to form a body of the final length of the article and then expanding said body to a substantial degree diametrically so as to form an open-ended body of greater length and less wall thickness than the blank and of substantially uniform internal diameter.

22. The method of making a hollow open-ended article from a charge of plastic vitreous material, which consists in shaping the charge to form an annular blank of predetermined fixed length, internal diameter and wall thickness and open at each end, extending said blank longitudinally to form a body of less wall thickness than the blank and of the length of the finished article, and then diametrically expanding the body and shaping it externally on expansion against an outer forming surface so as to form a body open at each end and of substantially uniform internal diameter and of greater length and internal diameter and less wall thickness than the blank and having an outer surface of a predetermined configuration conforming to said forming surface.

23. The method of making an open-ended article from a charge of plastic vitreous material, which consists in shaping the charge to form an annular blank of predetermined fixed length, internal diameter and wall thickness, compressing the blank to form a blank having thinned ends and a thickened intermediate portion, longitudinally stretching the blank to thin out said thickened portion and form an elongated body of substantially uniform wall thickness and of greater length and less wall thickness than the blank and of the final length and wall thickness of the finished article, and radially expanding the body so as to form an open-ended article of a predetermined substantially uniform internal diameter.

24. The method of making a hollow open-ended article of vitreous material comprising removing a charge of plastic vitreous material from a source of supply and forming it into an annular blank of a predetermined fixed length, diameter and wall thickness and substantially fully open at each end, then operating upon said annular blank to extend the same longitudinally to form a body of the final length and wall thickness of the finished article, and then expanding said body to a substantial degree diametrically so as to form an open-ended body of greater length and less wall thickness than the blank and of substantially uniform internal diameter.

25. The method of making an open-ended cylindrical article from plastic vitreous material, which consists in forming an annular blank of the plastic material which is of a predetermined fixed length, diameter and wall thickness and formed with open end portions of substantially uniform diameter and of comparatively thin wall thickness and with an intermediate portion of materially greater wall thickness, stretching the blank longitudinally to form an open-ended body of greater length than the blank and of substantially uniform wall thickness and of the length and substantially the final wall thickness and internal diameter at its ends of the article to be produced but of an internal diameter between its ends less than that of the article to be produced, and then expanding the body diametrically against an outer forming surface to impart thereto a substantially uniform internal diameter throughout its length and a predetermined external contour and finish conforming to said surface.

26. The method of making a hollow open-ended article from plastic vitreous material which consists in forming an annular blank of predetermined fixed length, internal diameter and wall thickness and having open ends of substantially uniform diameter, elongating the blank to a predetermined greater length and less wall thickness, and then diametrically expanding the blank against an external forming surface to produce an open-ended article of substantially uniform internal diameter and of a configuration conforming to the external forming surface.

27. The method of making a hollow open-ended article from plastic vitreous material which consists in forming an annular blank of predetermined fixed length, internal diameter and wall thickness and formed with open end portions of comparatively thin wall thickness and of substantially uniform diameter and with an intermediate portion of materially greater wall thickness and less internal diameter than the end portions, elongating the blank to a predetermined greater length and so as to reduce the wall thickness of the intermediate portion to substantially that of the end portions without transforming the internal diameter of the intermediate portion to its intended diameter in the finished article, and then diametrically expanding the blank to produce an open-ended article of substantially uniform internal diameter throughout its length.

28. The method of making an open-ended cylindrical article from plastic vitreous material, which consists in forming an annular blank of predetermined fixed length, diameter and wall thickness and formed with end portions of comparatively thin wall thickness and of substantially uniform internal diameter and with an intermediate portion of materially greater wall thickness and less internal diameter than the end portions, stretching the blank to a predetermined greater length and so as to reduce the wall thickness of its intermediate portion to substantially that of the end portions without transforming the internal diameter of the intermediate portion to its intended diameter in the finished article, and then expanding the body diametrically against an outer forming surface to impart thereto a substantially uniform internal diameter throughout its length and a predetermined external contour and finish.

PAUL R. LUERTZING.
WALTER O. LUERTZING.